2,918,965

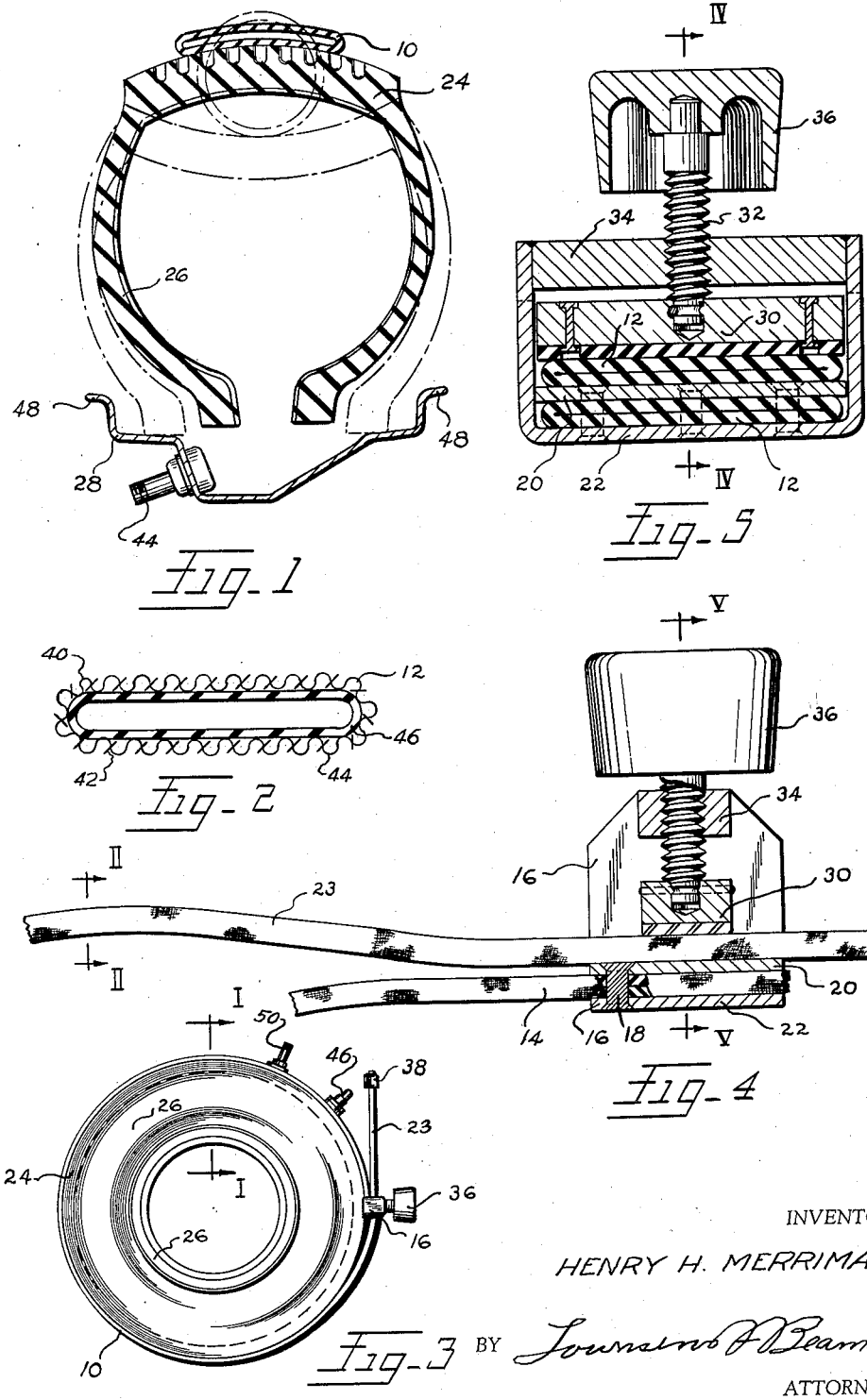

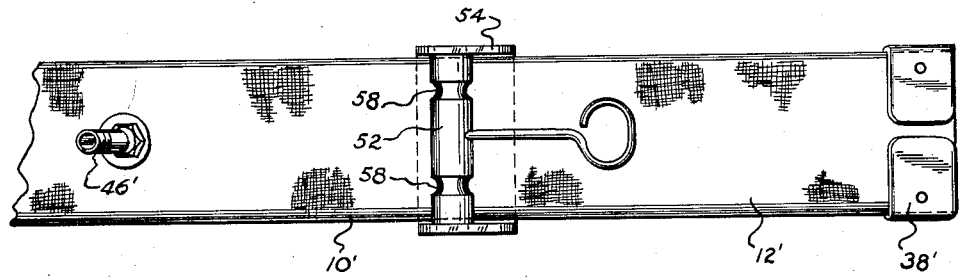
Fig-6
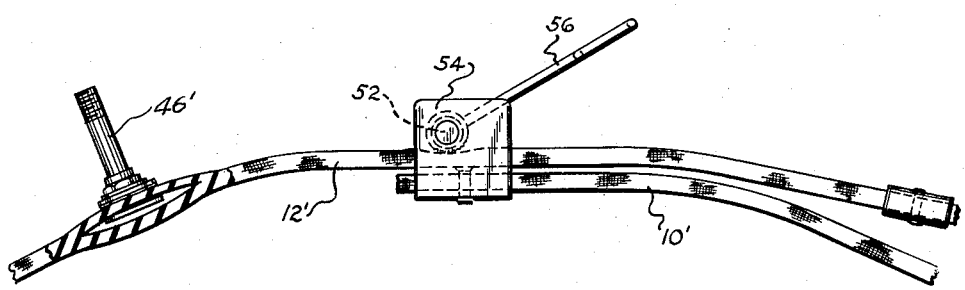
Fig-7
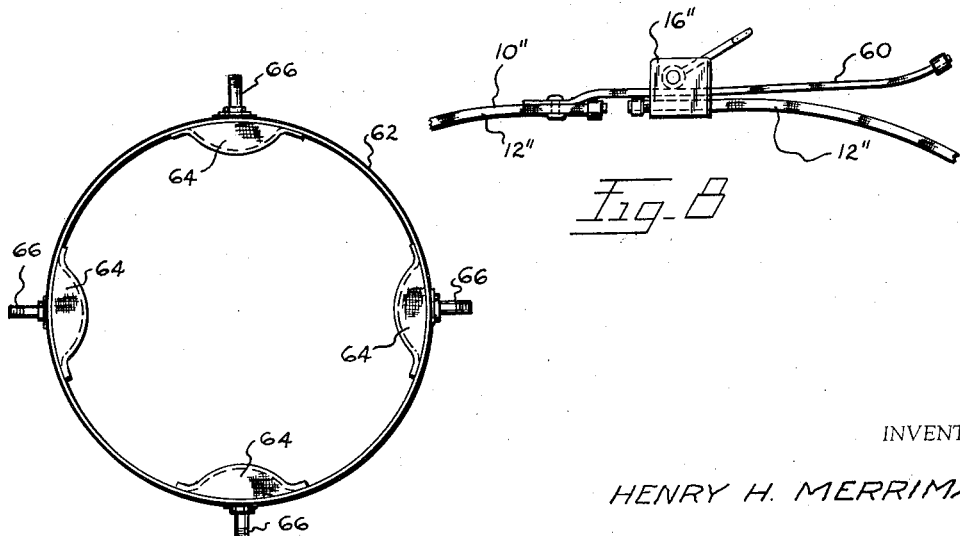
Fig-8
Fig-9
INVENTOR
HENRY H. MERRIMAN
BY Townsend F Beaman
ATTORNEY Dec. 29, 1959     H. H. MERRIMAN     2,918,965
FLUID PRESSURE ACTUATED TIRE COMPRESSING
AND BEAD SEATING DEVICE
Filed Feb. 14, 1955     3 Sheets-Sheet 3
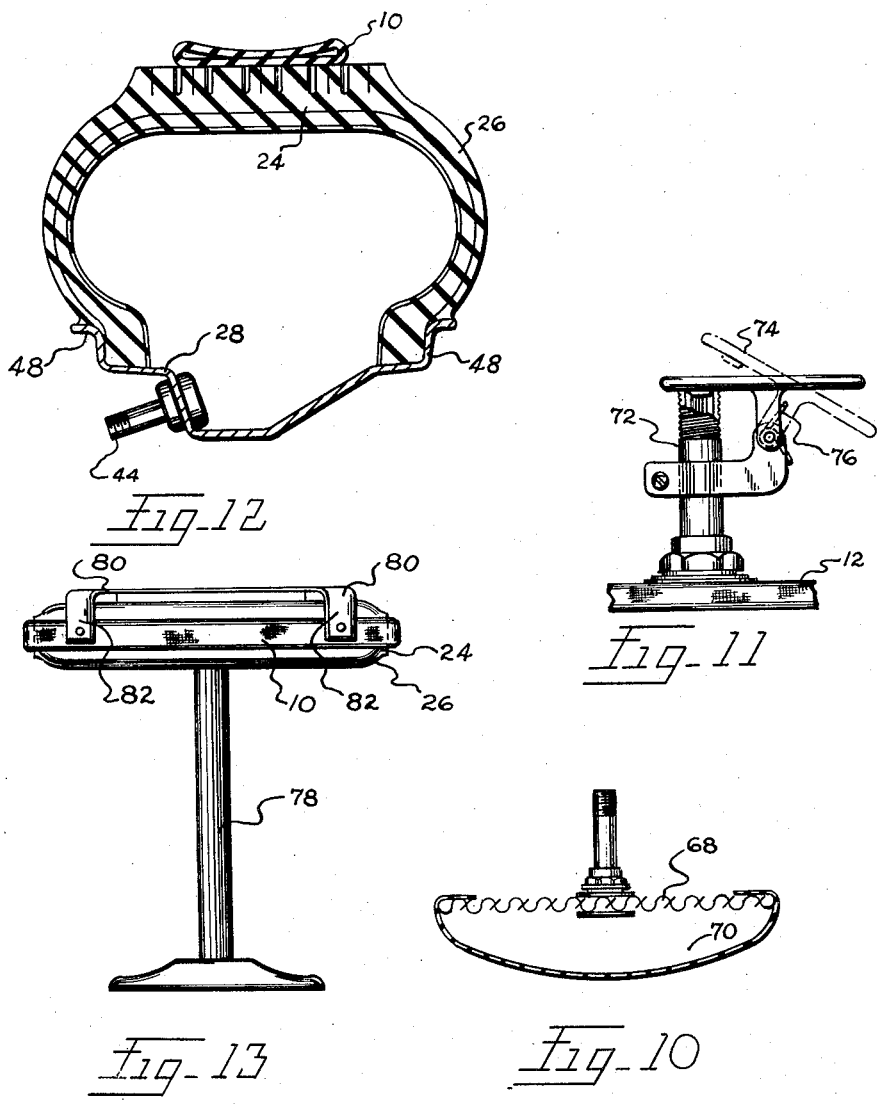
INVENTOR
HENRY H. MERRIMAN
BY *Townsend F. Beaman*
ATTORNEY United States Patent Office 2,918,965
Patented Dec. 29, 1959

FLUID PRESSURE ACTUATED TIRE COMPRESSING AND BEAD SEATING DEVICE

Henry H. Merriman, Jackson, Mich.

Application February 14, 1955, Serial No. 487,843

3 Claims. (Cl. 157—1.21)

The present invention relates to improvements in accessories for aiding in the inflation of tubeless tires, being particularly concerned with an inflatable band for compressing or distorting the tread of tubeless tires to position the beads of the tires on the wheel rim preparatory to initial inflation.

Since the recent introduction of tubeless tires for automobiles, the problem of locating the tire upon the wheel rim in a position to make inflation feasible has brought forth numerous devices for contracting the tire at the tread in order to urge the side walls outwardly to position the beads where initial inflation of the tire may take place. These devices have, in general, taken the form of contractible bands and cables capable of effecting the necessary distortion of the tire when tightened through some auxiliary mechanical means. However, the design of such devices has been such that they are dangerous in the hands of inexperienced and careless persons as the inflation of the tire without adjustment of the band is capable of setting up excessive tensile stresses which may result in rupture of the band, cable or associated structure.

According to the present invention a device of the character described in the opening paragraph of this specification has been provided which depends upon inflation by fluid pressure to distort the tire in contrast to a band, cable or the like, contracted or shrunk through circumferentially applied tension.

Preferably, my improved device for assisting in the inflation of tubeless tires takes the form of a length of flexible hose or tubing which may be readily flattened. In practice, a light grade of seamless woven fire hose, having a flattened width of approximately two and one-half inches, has been found satisfactory and is a good example of one type of flexible hose or tubing readily available on the market for the purpose of fabricating the present invention. A hose or tubing having a flexible inner rubber liner and a flexible woven or braided outer cover of cotton or other suitable textile strands, both natural and synthetic, is entirely satisfactory as it may be inflated without material expansion or stretching beyond the initial woven or braided size of the outer cover.

I propose to embrace a tubeless tire prior to its initial inflation with a length of flattened flexible hose or tubing having the ends attached in some suitable manner to form a band capable of snugly engaging the tread of the deflated tire. This band is then inflated to change the cross-sectional shape of the band from a flattened tube into one of inflated shape tending toward circular cross section. Because the band resists expansion beyond its original woven or braided shape, inflation of the band from the flattened and collapsed shape toward a circular cross-sectional shape results in a reduction in the internal diameter of the band which squeezes and distorts the tread of the tire.

To improve the safe and facile operation of my inflatable accessory for tubeless tires, I have provided means for the automatic release of excessive pressure which may result from the complete inflation of the tire with the accessory applied. In one of the illustrated forms the automatic release of pressure is carried out through a combination manual clamp and exhaust valve so designed as to effect rapid deflation of the accessory.

Thus, an object of the invention is to provide an accessory of the type described in which contraction of the tire is accomplished by inflation of the accessory.

Another object is to provide an accessory for the initial inflation of tubeless tires which, in one form, comprises a length of inflatable, collapsible, and relatively non-stretchable tubing having means for embracing the tread of the tire.

Another object is to provide an inflatable accessory of the type described which is adjustable to various tire sizes.

A further object is to provide an inflatable annular accessory of the type described in the form of a flat tubing with a combination clamp and valve for controlling the inflation and deflation and determination of size.

A still further object of the invention is to provide an inflatable accessory of the type described which is safe and effective in operation even in the hands of inexperienced persons.

These and other objects and advantages residing in the specific construction, arrangement and combination of component parts going to make up the several illustrated forms of the present invention, will more fully appear from the following specification and the appended claims.

In the drawings,

Fig. 1 is a cross-sectional view through a tire and rim demonstrating the function of the accessory, Fig. 2 is an enlarged cross-sectional view of the inflatable hose structure, Fig. 3 is a side-elevational view of a tire and rim assembly showing the accessory applied to the tread of the tire, Fig. 4 is a cross-sectional view taken on line IV—IV of Fig. 5 of the clamping structure of the accessory, Fig. 5 is a cross-sectional view of the clamping structure of the accessory taken on line V—V of Fig. 4, Fig. 6 is a fragmentary plan view of another form of the invention, Fig. 7 is a side-elevational view of Fig. 6, Fig. 8 is a view similar to Fig. 7 of still another form of the invention, Fig. 9 shows another form of the accessory according to the present invention embodying the individual inflatable bladders, Fig. 10 is a cross-sectional view of a band member having an inflatable structure attached to the inner side thereof, Fig. 11 is a side-elevational view of one form of combined air inlet and safety valve structure, Fig. 12 is a view similar to Fig. 1 of the tire completely inflated and the accessory deflated, and Fig. 13 is a side-elevational view of a tire mounting standard showing a tire supported thereon and the accessory according to the present invention associated with the tire.

Referring to the form of the invention shown in Figs. 1 to 5, inclusive, the accessory 10 comprises a length of tubing or hose 12 having one end 14 permanently attached and sealed to a clamp structure 16 by rivets 18 extending between the bottom portion 20 and the separate plate 22.

The other end 23 of the hose 12 after being wrapped around the tread 24 of the tubeless tire 26 on the wheel rim 28 is inserted between the bottom portion 20 and the adjustable clamping foot 30, the latter being moved relative to the portion 20 through a shaft 32 threaded in the cross member 34 and adapted to be rotated by the knob 36 to apply or release clamping pressure relative to that portion of the hose 12 within the clamp structure 16.

Depending upon the size of the tire 26 more or less of the end 23 of the hose or tubing 12 will be drawn through the clamp structure 16 in order to snugly embrace the tread 24 of the tire 26, as shown in Figs. 3. Preferably a suitable ferrule 38 is attached to the end portion 23 to protect the end edge of the hose without sealing the hose or tubing end edge against the exhausting of fluid from the hose or tubing interior for reasons to be more fully described.

As more clearly shown in Fig. 2, one suitable type of hose or tubing 12 is illustrated as a cut length of seamless hose having an outer cover 40 of textile warp strands 42 interwoven with a continuous spiral weft 44 to reinforce the fluid sealing interior liner 46 of rubber or other suitable material, all as is well known to those skilled in the art of making fire hose and similar goods.

I have found in practice that a standard one and one-half inch diameter fire hose, which is two and one-half inches in width flattened, is ideal for the purpose of the invention as it is highly pliable and flexible, readily collapses into a flat tube and upon inflation is relatively non-stretchable. Obviously, other forms of tubing and hose having similar characteristics may be employed with similar results.

Referring to Fig. 1, when the tire 26 is first mounted upon the rim 28 it may assume a position similar to that shown in full line which would not permit inflation by air directed through the valve stem 44. To position the tire 26 relative to the rim 28 where initial inflation of the tire 26 may take place, the accessory 10 embraces the tread 24 as shown in Figs. 1 and 3, air is directed through the valve stem 46 to inflate the tubing or hose length 12 into the form and position shown in dotted line in Fig. 1. Being unable to stretch materially, upon inflation, the hose 12 held in the form of a band by the clamp structure 16, contracts upon the tread 24 to distort the same, as shown in dotted line in Fig. 1. Such distortion forces the side walls and beads of the tire 26 outwardly toward the flanges 48 of the rim 28 and into a position where initial inflation may take place. It will be understood that upon inflation of the hose 12 the band formed thereby may slightly wrinkle along its inside portion contacting the tread 24.

As initial inflation of the tire 26 takes place, the radial reaction of the tread 24 against the accessory 10 will increase tending to increase the pressure within the inflated length of hose 12. To avoid excessive pressure being built up within the hose 12, a control vent such as a suitable safety valve 50 may be provided to release air from the inflated accessory 10. With the tire 26 inflated, as shown in Fig. 12, the adjustable clamping foot 30 is raised from its clamping and sealing position and the air readily exhausted from the accessory 10 out through the terminal end of the hose 12 protected by the ferrule 38. With the accessory 10 thus collapsed and all stress removed therefrom, as appears in Fig. 12, it may be conveniently removed from the tire 26.

In the form of the invention of Figs. 6 and 7, the accessory 10' may be similar to that described in Figs. 1 to 5, inclusive, with the clamp structure 16' having an eccentrically mounted roller 52 mounted on the clamp frame 54 and rotated from one position to another by the handle 56. To provide for a slow leak past the roller 52 when in a position clamping the hose 12', grooves 58 are provided to let the air escape through the vented end of the hose 12' protected by the ferrule 38' as initial inflation of the tire takes place following inflation of the accessory 10'. This arrangement will avoid the degree of need for the safety valve 50 of the form of the invention of Fig. 3.

Referring to Fig. 8, in lieu of one end of the length of hose 12" defining the accessory 10" being inserted through the clamp structure 16", a length of woven webbing 60 may be attached to the said one end as shown. This reduces the amount of hose required for the accessory 10", yet permits adjustment to various tire sizes.

In Fig. 9 is shown another form of the invention in which a strap woven webbing 62, or other suitable relatively pliable and non-stretchable material, in the form of an annular band has a plurality of separately inflatable cells 64 disposed upon the inside of the band. In use, the band of webbing 62 embraces the tread of the tire and then the cells 64 are inflated through the valve stem 66. This results in localized distortion of the tread at circumferential spaced points around the tire which is sufficient to effect positioning of the side wall and beads to enable initial inflation.

Fig. 10 shows a further form of the invention similar to Fig. 9 except the woven webbing band 68 has a continuous inflatable cell 70 extending throughout substantially the entire inner circumference of the band 68.

A combination fluid inlet and safety release valve is shown in Fig. 11 wherein the stem 72 is adapted to receive the standard air chuck for inflation of the tubing or hose 12 when the cap 74 is manually urged into the dotted line position shown. A spring 76 normally holds the cap 74 in the full line position to retain air pressure in the tubing 12 in an amount dependent upon the tension of the spring 76. When the pressure within the tubing 12 overcomes the spring 76, leakage will take place thus avoiding a dangerous build up of pressure within the tubing 12 should the tire be fully inflated with the accessory 10 in position.

Fig. 13 shows the tire 26 and rim 28 mounted upon the stand 78. To hold the accessory 10 in position embracing the tread 24, crossed straps 80 have their ends 82 connected to the hose band 12 at circumferentially spaced points as shown.

Having thus described my invention, what I claim as novel and wish to cover by Letters Patent is:

1. A pneumatic tire tool for assisting in the initial inflation of tubeless tires of vehicles comprising an inflatable, collapsible, relative nonstretchable member of a length greater than the circumference of the tire at its tread to embrace the tread as a relatively flat band, means for connecting the ends of said member to form a tire tread embracing band, said means being in the form of a clamp to which one end of said member is attached and through which the other end of said member is inserted, said clamp having surfaces adjustable relative to each other to grip said member between them, and means connecting with the interior of said member through which a fluid may be directed to inflate the same and to alter its flattened cross section to reduce the inside diameter of the flat band and to distort the tire tread radially inward.

2. A pneumatic tire tool as defined in claim 1 wherein said clamp has a U-frame, means attaching and sealing one end of said member to the interior surface of the web of said U-frame, a clamp element supported across the legs of said U-frame, the other end of said member being adjustable through said U-frame and clamped by said element in imposed relation to said attached end.

3. A pneumatic tire tool for assisting in the initial inflation of tubeless tires of vehicles comprising a length of inflatable, collapsible, relatively nonstretchable tubing of a length greater than the circumference of the tire at its tread to embrace the tread as a relatively flat band, means for connecting the ends of said length of said tubing to form a tire tread embracing band, said means being in the form of a clamp to which one end of said length of tubing is associated and through which the other end of said tubing is inserted, said clamp having surfaces adjustable relative to each other to flatten and seal said tubing between them, the end of said tubing clamped between said surfaces being open to the atmosphere for rapid deflation of said tubing upon release of said clamp, and means connecting with the interior of said tubing through which a fluid may be directed to inflate the same to alter its flattened cross section to reduce the inside diameter of the flat band and to distort the tire tread radially inward.

References Cited in the file of this patent

UNITED STATES PATENTS

| | | |
|---|---|---|
| 1,004,986 | Burkett | Oct. 3, 1911 |
| 1,559,972 | Midgley | Nov. 3, 1925 |
| 1,679,978 | Konwiser | Aug. 27, 1928 |
| 1,884,144 | Norquist | Oct. 25, 1932 |
| 2,322,962 | Dickson et al. | June 29, 1943 |
| 2,394,290 | Butler | Feb. 5, 1946 |
| 2,406,628 | Patchen | Aug. 27, 1946 |
| 2,468,133 | Sullivan | Apr. 26, 1949 |
| 2,660,174 | Saeman | Nov. 24, 1953 |
| 2,679,662 | Pfeiffer | June 1, 1954 |